US00RE34557E

United States Patent [19]

Grigsby

[11] E Patent Number: Re. 34,557

[45] Reissued Date of Patent: Mar. 8, 1994

[54] WOOD REINFORCED CORRUGATED PAPERBOARD SHIPPING CONTAINER WITH ATTACHING STRIPS

[75] Inventor: John M. Grigsby, Marietta, Ga.

[73] Assignee: North American Container Corporation, Mableton, Ga.

[21] Appl. No.: 704,345

[22] Filed: May 23, 1991

Related U.S. Patent Documents

Reissue of:

[64] Patent No.: 4,832,256
Issued: May 23, 1989
Appl. No.: 241,499
Filed: Sep. 7, 1988

U.S. Applications:

[63] Continuation of Ser. No. 936,426, Dec. 1, 1986, abandoned.

[51] Int. Cl.[5] ..... B65D 8/04

[52] U.S. Cl. ..... 229/23 C; 206/335; 206/386; 217/36; 217/65

[58] Field of Search ..... 229/23 C; 217/36, 43 A, 217/65; 206/335, 386

[56] References Cited

U.S. PATENT DOCUMENTS

| | | | |
|---|---|---|---|
| 1,098,405 | 6/1914 | Reinecke | 217/65 |
| 1,895,624 | 1/1933 | Hingston | 217/36 |
| 2,276,495 | 3/1942 | Kenfield | 229/23 C |
| 2,316,854 | 4/1943 | George et al. | 217/65 |
| 2,346,003 | 4/1944 | Bishop | 229/23 C |
| 2,361,937 | 11/1944 | Gondert | 229/23 C |
| 2,488,692 | 11/1949 | Talbot | 229/23 C |
| 2,596,320 | 5/1952 | Witte | 217/65 |
| 2,812,096 | 11/1957 | Muller | 217/65 |
| 2,965,276 | 12/1960 | Foster | 229/23 C |
| 3,136,472 | 6/1964 | Waller et al. | 229/23 C |
| 4,171,741 | 10/1979 | Fish | 229/23 C |

FOREIGN PATENT DOCUMENTS

| | | | |
|---|---|---|---|
| 1265313 | 5/1961 | France . | |
| 83681 | 12/1918 | Switzerland | 217/65 |
| 154055 | 11/1920 | United Kingdom | 217/65 |
| 311983 | 5/1929 | United Kingdom | 229/23 C |

OTHER PUBLICATIONS

"Wood Cleated Corrugated", North American Container Corp (date unknown).

"Load Hog TM V/Core TM" North American Container Corp. (date unknown).

*Primary Examiner*—Gary E. Elkins

*Attorney, Agent, or Firm*—Kennedy & Kennedy

[57] ABSTRACT

A wood reinforced corrugated paperboard shipping container is disclosed having a rigid wood base, a wood reinforced corrugated paperboard body attached thereto and a top frame. The wood reinforced corrugated paperboard body includes attaching strips at the location of the base whereby a wood-to-wood connection is achieved. The wood-to-wood connection, in combination with selectively notched vertical reinforcements, provides for heavy equipment to be packed, shipped, handled and stored without container component separation.

18 Claims, 3 Drawing Sheets

WOOD REINFORCED CORRUGATED PAPERBOARD SHIPPING CONTAINER WITH ATTACHING STRIPS

Matter enclosed in heavy brackets [ ] appears in the original patent but forms no part of this reissue specification; matter printed in italics indicates the additions made by reissue.

CROSS REFERENCE TO RELATED APPLICATION

This application is a continuation of U.S. Ser. No. 936,426 filed Dec. 1, 1986, now abandoned.

TECHNICAL FIELD

The present invention relates generally to wood reinforced corrugated boxes and, more particularly, to a wood reinforced corrugated paperboard shipping container for packing, shipping and storing heavy equipment.

BACKGROUND OF THE INVENTION

Packaging heavy, bulky machinery such as lawn and garden tractors, lawn mowers, snowmobiles, boat motors, engines, air compressors, air conditioners and the like presents many unique considerations. Because such machinery is by its nature difficult to handle and store, conventional double-wall or triple-wall laminated corrugated paperboard containers have long been recognized as being unsuitable for packaging heavy equipment. As a result, wood reinforced boxes with mating bases and top frames have been developed. These shipping containers are often referred to as wood cleated boxes.

The conventional wood cleated box consists of a wood reinforce corrugated paperboard body, a wooden top frame and a wooden base. At least one interior wall of the corrugated paperboard body is provided with a wood reinforcement vertically aligned to provide stacking strength. The corrugated paperboard body gives the container definition and maintains the position of the vertical wood reinforcements. The base member, often referred to as a skid board, supports the container and the product packed therein. The top frame closes off the container and provides a constant surface upon which another company may be stacked. This arrangement seeks to prevent collapse of the container even when shipped and stored in two to four unit stacks.

Conventional packaging of heavy equipment in a typical wood cleated box calls for the product to be packed by first being fastened to the base. The wood reinforced corrugated paperboard body is then placed over the product and slid down over the base. The corrugated paperboard body is stapled to the wood base in a conventional manner by a compressed air-driven staple gun. The top frame is inserted into the upper portion of the corrugated paperboard body and supported by the wood reinforcements of the corrugated paperboard body. Once the top flaps of the box are folded and secured in place, steel or plastic banding is often provided to grid the completed package.

While conventional wood reinforced shipping containers have proven adequately effective for packaging heavy equipment, several problems exist. These containers are often handled by fork lifts. Forklifts require that the shipping container include an external skid board below the container base to provide clearance for the fork blades. Thus, not only is an extra component part required, but the product is stored at a significantly greater height. Such additional height is compounded in a three or four high stack of unit containers. The additional component (the skid board, pallet, etc.) renders stacking a more difficult task because the container can slide thereabout. Yet another problem with forklifts is operator error. Even when acting with due care, a forklift operator may misdirect the fork blades and pierce the container, thereby causing damage not only to the container but the product packaged therein.

For these and other reasons, clamp trucks are often preferred over fork lifts for handling packaged heavy machinery. Clamp trucks provide a pair of hydraulically activated arms that squeeze the container in order to lift and transport it. In preferred use, the arms of the clamp truck are placed about the base of the conventional wood cleated box so as to exert the squeezing action against a solid, rigid member. Thus, there is no need for an external skid board, pallet or like member when using a clamp truck. Clamp trucks have been found to provide superior handling capability, resulting in less damage to the package and contents. Additionally, clamp trucks can be used to stack unit packages to a greater height and, once stacked, to straighten the individual containers within any particular stack.

The conventional wood cleated box is unsuited for handling by a clamp truck. A principal problem is separation of the base and the corrugated paperboard body. While it is recommended that the clamp truck arms be placed about and squeezed against the rigid base of the conventional wood cleated box, the arms are often clamped about the corrugated paperboard body. Because the packaged product is extremely heavy, a tremendous downward force is exerted against the base of the conventional box. As a result, the staples that secure the base to the corrugated paperboard body often work through the paperboard and are pulled loose. As a result, the base and the packaged product secured thereto fall from the corrugated box body, causing irreparable damage to the container, significant damage to the product and potential harm to bystanders.

Furthermore, those skilled in the art will recognize that twisting, lateral forces are exerted on all containers during shipment. When three or four containers are stacked one on top of the other in a truck, rail car or the like, the jostling action resulting from typical transport will cause the staples to work through the corrugated paperboard body wall. This, of course, can result in separation of the base and the corrugated paperboard body upon handling by either a forklift or a clamp truck.

Thus, there is a need in the prior art for a wood reinforced shipping container that addresses the problems of base and body separation so that the container's integrity is assured during packing, shipping and storage.

SUMMARY OF THE INVENTION

The present invention solves the above-described problems in the prior art by providing a wood reinforced corrugated paperboard shipping container that insures against separation of the component parts of the container. More particularly, the present invention provides separate, specifically configured attaching strips on the lowermost portion of the corrugated paperboard body. The attaching strips, in combination with the vertical wood reinforcements, facilitate a wood-to-wood connection between the base and the corrugated paperboard body. This wood-to-wood connection insures the base will stay attached to the corrugated paperboard body during shipment and handling.

Generally described, a wood reinforced corrugated paperboard shipping container constructed in accordance with the present invention comprises a rigid base that supports the article to be packed, a reinforced corrugated paperboard body including a plurality of substantially vertically aligned reinforcing members and a plurality of attaching strips fixedly secured at the lowermost portion of the corrugated paperboard body and a top frame set across the uppermost end of the corrugated paperboard body to close off the container. The container is assembled by securing the article to be packaged to the base and placing the corrugated paperboard body over the article onto the base. The attaching strips are aligned with the sides of the base and fixedly secured thereto The top frame is placed into the uppermost portion of the corrugated paperboard body and depends from the substantially vertically aligned reinforcing members to close off the container. The securing of the attaching strips to the base provides a wood-to-wood connection that assures that the integrity of the container will be maintained.

Thus, it is an object of the present invention to provide an improved wood reinforced corrugated paperboard shipping container.

It is a further object of the present invention to provide a wood reinforced corrugated paperboard shipping container that insures against component part separation.

It is a further object of the present invention to provide a wood reinforced corrugated paperboard shipping container that provides a wood-to-wood connection between the base frame and the reinforced corrugated paperboard body of the container so as to insure against separation thereof.

It is a further object of the present invention to provide a wood reinforced corrugated paperboard shipping container that can be handled by clamp trucks and forklifts.

It is a further object of the present invention to provide a wood reinforced corrugated paperboard shipping container that not only insures against component separation, but that can be shipped in a knocked-down fashion.

It is a further object of the present invention to provide a wood reinforced corrugated paperboard shipping container that permits the vertical reinforcing members to be secured directly to the base.

It is a further object of the present invention to provide a wood reinforced corrugated paperboard shipping container that protects the packaged product even when the container is mishandled or dropped.

These and other objects, features and advantages will become apparent from a reading of the following detailed description of the invention and claims in view of the appended drawings.

DETAILED DESCRIPTION

Figure 1:
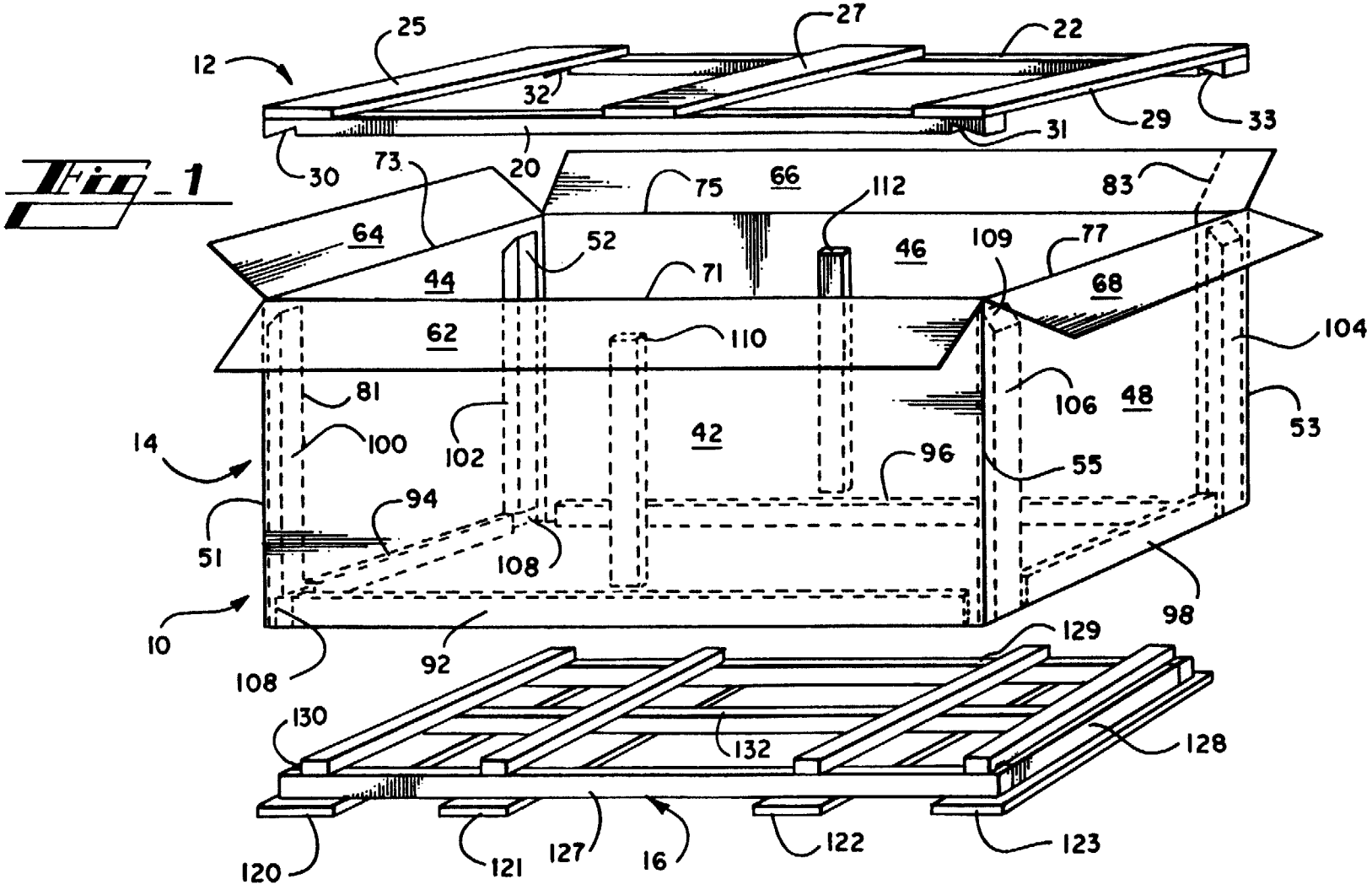
FIG. 1 is a pictorial view of a preferred embodiment of a container constructed in accordance with the present invention, with certain key portions of the embodiment shown in phantom.

Referring now in more detail to the drawings, in which like numerals indicate like parts throughout the several views, FIG. 1 shows a preferred embodiment of a reinforced corrugated paperboard shipping container with attaching strips according to the present invention generally at 10. The container 10 includes a top frame 12 positioned immediately above a corrugated paperboard body 14. Immediately below the corrugated paperboard body 14 is the bottom frame 16. Each of these component parts of the present invention are described in detail hereinbelow.

Figure 4:
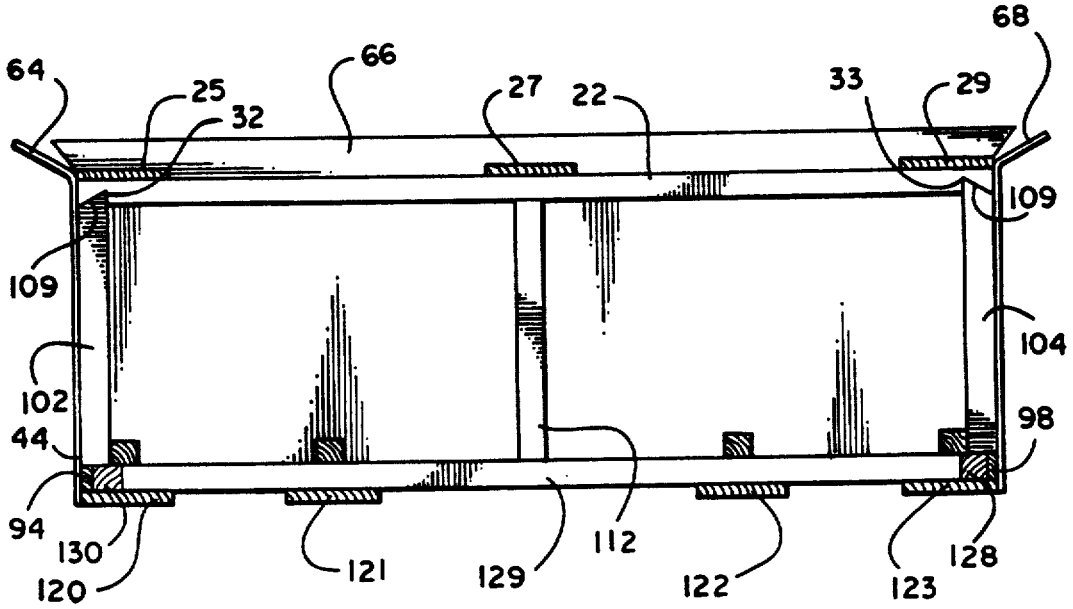
FIG. 4 is a section view of the embodiment shown in FIG. 1.
Figure 4A:
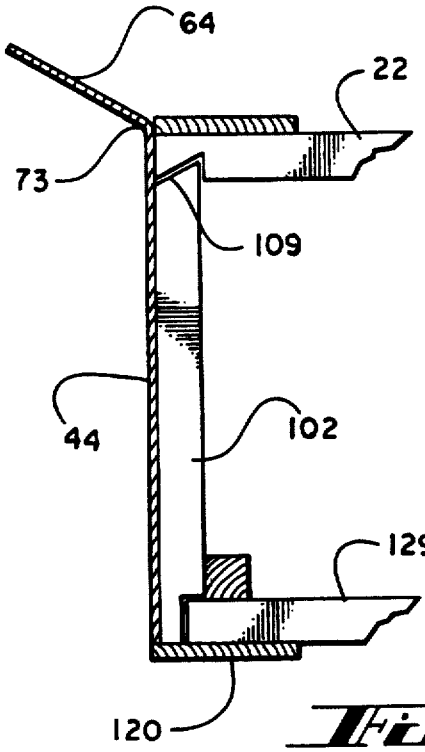
FIG. 4A is a partial view of the embodiment shown in FIG. 4, with a portion cut away to show the vertical support.

The top frame 12 consists of two wood pieces 20 and 22 that run lengthwise of the box. Secured to the top of the two lengthwise pieces 20 and 22 are three wood pieces 25, 27 and 29. These elements 20, 22, 25, 27 and 29 may be secured in this arrangement by nails, staples or any suitable connector. As shown best in FIG. 1 and FIG. 4, the top frame 12 is dimensioned to sit in the uppermost portion of the corrugated paperboard body 14. It is to be noted that the lengthwise elements 20 and 22 are each formed with notches 30, 31 and 32, 33, respectively. The notches 30, 31, and 32, 33 facilitate mating receipt of the top frame 12 by the corrugated paperboard body 14 as described below.

Figure 2:
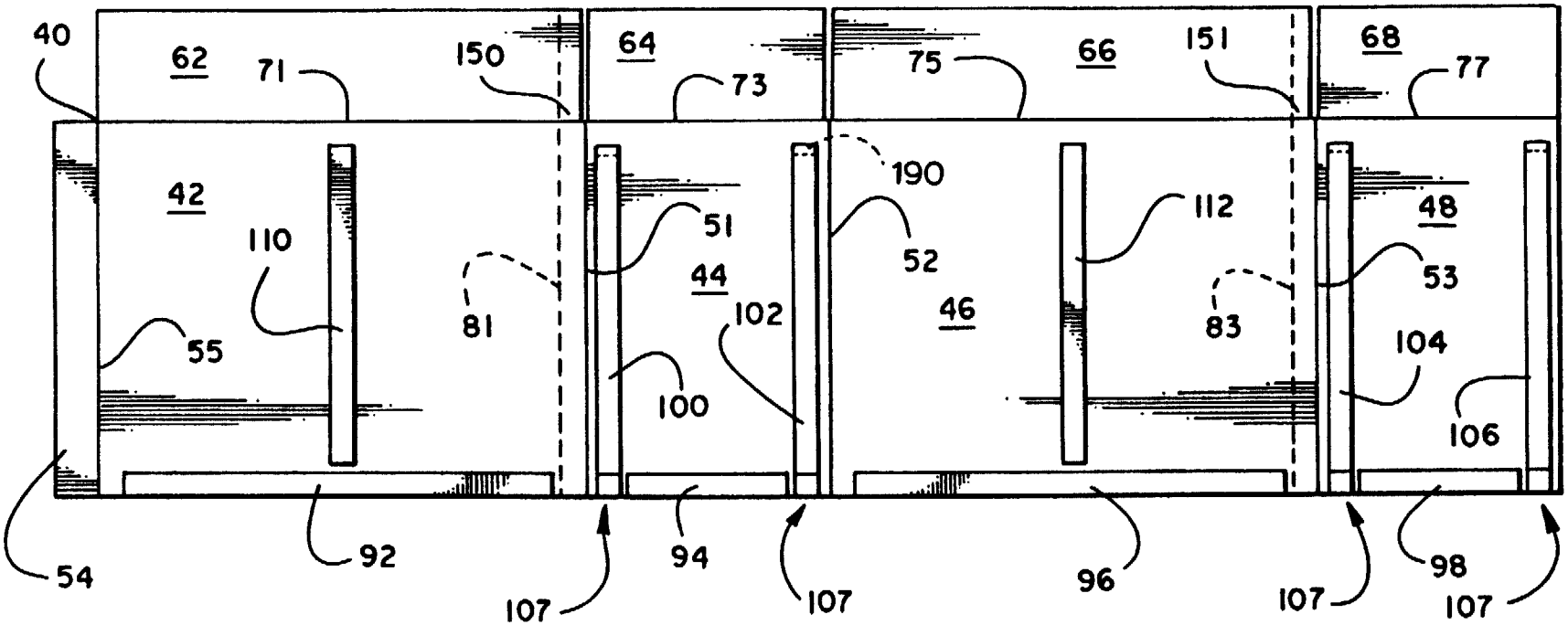
FIG. 2 is a top plan view of the corrugated paperboard blank for forming the body portion of the container shown in FIG. 1.

The corrugated paperboard body 14 of the present invention is formed by a blank of corrugated paperboard material. FIG. 2 shows a typical blank 40 of such material. The blank 40 includes four main panels 42, 44, 46 and 48 foldably connected along three score lines 51, 52 and 53. The four main panels 42, 44 46 and 48 form the four walls of the container 10 as shown in FIG. 1. A manufacturer's crush tab 54 is foldably connected to the main panel 42 along a score line 55. The function of the crush tab 54 is well known to those skilled in the art and is otherwise outside the scope of the present invention. A series of four top flaps 62, 64, 66 and 68 are foldably connected to the main panels 42, 44, 46 and 48, respectively, along score lines 71, 73, 75 and 77. It will be noted that additional folding scores are provided on the blank 40. An additional folding score 81 is provided on main panel 42 and top flap 62. A second additional folding score 83 is provided on main panel 46 and top flap 66. The function of these additional scores is described in detail below.

Each main panel 42, 44, 46 and 48 is provided with an attaching strip 92, 94, 96 and 98, respectively, at their lowermost portion. The attaching strips 92, 94, 96 and 98 are preferably made of a dense hardwood and extend substantially the length of their respective main panels 42, 44, 46 and 48. The attaching strips 92 and 96 extend up to but do not cross the fold lines 81 and 83, respectively. The attaching strips 92, 94, 96 and 98 are fixedly secured in these positions preferably by both staples and adhesive. However, any suitable means of attachment is acceptable.

Figure 3:
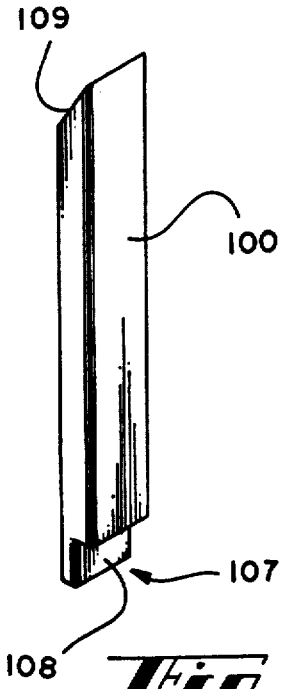
FIG. 3 is a perspective view of a corner wood cleat of the embodiment shown in FIG. 1.

The main panels 44 and 48 of the blank 40 are each provided with vertical corner reinforcements. Main panel 44 is provided with vertical corner reinforcements 100 and 102. Main panel 48 is provided with corner reinforcements 104 and 106. The vertical reinforcements 100, 102, 104 and 106 are preferably made of a dense hardwood and extend substantially the height of their respective main panels 44 and 48. The lowermost edge of the vertical reinforcements 100, 102, 104 and 106 sit near the very bottom of their respective main panels 44 and 48. The bottom portion of each vertical reinforcement 100, 102, 104 and 106 is notched; the notch being generally indicated at 107. FIG. 3 shows vertical corner reinforcement 100 in isolation. The lowermost portion of corner vertical reinforcement 100, as indicated generally at 107 is cut away to provide an indent a recessed wall 108. The uppermost portion of each corner vertical reinforcement 100, 102, 104 and 106, as illustrated in FIG. 3 by vertical corner reinforcement 100, is beveled such that the outer portion of the reinforcement is of greater height than the innermost portion of the reinforcement. The beveled surface 109 is preferably angled at a 24° angle.

Main panels 42 and 46 are provided with reinforcing members 110 and 112, respectively. Reinforcing members 110 and 112 are preferably made of dense hardwood and extend substantially the height of their respective main panels 42 and 46. However, as opposed to the vertical corner reinforcements 100, 102, 104 and 106, the center reinforcements 100 and 112 extend no lower than the attaching strips 92 and 96, respectively. In addition, the center reinforcements 110 and 112 extend no higher than the inner most edge of the top surface 109 of the vertical corner reinforcements 100, 102, 104 and 106.

The base 16 of the container 10 consists of four floorboards 120, 121, 122 and 123 that extend the entire width of the base 16. Secured to the floorboards 120–124 are wood strips 127, 128, 129 and 130 that form a rectangular base member collectively referred to as the base crown. The strips 127–130 are preferably made of a dense hardwood and may be fastened or otherwise secured to the floor boards 120–123 by nails, wood screws, glue or any other suitable means. The frame 16 further consists of a center reinforcing strip 132 that extends between strips 128 and 130 to give stability to the frame 16. It will be noted that the wood strips 127, 128, 129 and 130 are set off from the corner of the floor boards 120 and 123. The purpose of this set off is described in detail hereinbelow.

In practice of the present invention, the blank of corrugated paperboard 40 is laid flat as shown in FIG. 2. The attaching strips 92, 94, 96 and 98 are fully glued and stapled to the main panels 42, 44, 46 and 48, respectively. A preferred adhesive is polyvinyl alcohol (PVA), but any suitable adhesive may be used. The preferred staples are ½" to 1" crown, having a leg length equal to approximately the thickness of the attaching strips 92, 94, 96 and 98 plus the thickness of the blank 40. It is furthermore preferred that the staples be spaced apart a distance of approximately 4" and angled at 45° to achieve maximum contact of the corrugated paperboard main panels 42, 44, 46 and 48 to their respective attaching wood strips 92, 94, 96 and 98. While it is preferred that the attaching strips 92, 94, 96 and 98 be located along the bottom edges of the interior of the main panels 42, 44, 46 and 48, respectively, the attaching strips may be secured to the exterior surfaces of the main panels.

In a similar manner, the vertical corner reinforcements 100, 102, 104 and 106 are attached to their respective main panels 44 and 48, It is to be noted that the notches 107 in each corner vertical reinforcement 100, 102, 104 and 106 are aligned with their respective attaching strips 94 and 98 on main panels 44 and 48, respectively. Additionally, the center reinforcements 110 and 112 are glued and stapled to their respective main panels 42 and 46. Once the corrugated paperboard body 14 is formed, it is placed over the base 16. As shown best in FIG. 1 and FIG. 4, the notch 107 in the bottom portion of the vertical corner reinforcements 100, 102, 104 and 106 is positioned such that the notch surface 108 sits flush against the base crown and in particular against the wood strips 128 and 130, respectively. Similarly, the attaching strips 92, 94, 96 and 98 sit flush against the wood strips 127, 130, 129 and 128, respectively. It will be appreciated that the thickness of the wood strips 92, 94, 96 and 98 must be not greater than half the thickness of the vertical corner reinforcements 100, 102, 104 and 106. The outermost portion of the attaching strips 92, 94, 96 and 98 is to be in alignment with the outermost portion of the notched surface in the vertical reinforcements 100, 102, 104 and 106. When the corrugated paperboard body 14 is thus fit about the crown of the base 16 formed by the strips 127–130, the strips 127–130 may be joined to the attaching strips 92, 94, 96 and 98 and the notched portion 107 of the vertical corner reinforcements 100, 102, 104 and 106. Thus, the present invention provides a wood-to-wood connection at the location of the base 16.

The top frame 12 is configured to fit inside the upper dimensions of the corrugated paperboard body 14. The notches 30, 31 and 32, 33 of the respective lengthwise wood pieces 20 and 22 are positioned to fit over the beveled surfaces 109 at the top of the corner vertical reinforcements 100, 106 and 102, 104, respectively. This arrangement serves to lock the top frame 12 into the corner vertical reinforcements 100, 102, 104 and 106. The cross pieces 25, 27 and 29 are positioned to clear and to protect any heavy packaged machinery.

In order for the finished wood reinforced corrugated paperboard shipping container of the present invention to knock down into a flat condition for shipment, the additional scores 81 and 83 are provided in diagonally opposite corners of the set-up container 10. These scores are of a sufficient distance from the main panel scores 51 and 53, respectively, to allow the box 10 to fold around the corner vertical reinforcements 100, 102, 104 and 106. In addition, slits 150 and 151 may be cut along the top flap score line 71 and 75 to allow the box to knock down without tearing the flap.

It will be appreciated that the above-described invention provides a significant advantage over prior art containers in that a wood-to-wood arrangement is provided at the intesection and joining of the base 16 and the corrugated paperboard body 14. This wood-to-wood arrangement insures connection of the respective component parts and prevents separation of the base 16 from the rest of the container 10 under normal conditions of packing, shipping, handling and storing. The notches 107 are critical to the present invention because they maintain a constant attaching surface along the interior portion of the container 10 at the location of the attaching strips 92, 94, 96 and 98. In addition, the notches 107 in the vertical corner reinforcements 100, 102, 104 and 106 provide for the vertical corner reinforcements themselves to be connected directly to the base. This arrangement helps to secure the entire corrugated paperboard body 14 to the base 16 and provides additional racking resistance for stacking purposes.

Furthermore, the notch 107 in each of the corner vertical reinforcements 100, 102, 104 and 106 provides clamp truck resistance. When the clamp truck arms squeeze the corner vertical reinforcements 100, 102, 104 and 106, their attachment to the crown of the base 16 greatly improves resistance to racking or sideways collapsing of the entire container 10 under such stress.

This specification has thus described a preferred embodiment of the present invention, including the steps necessary for fabricating this preferred embodiment. It is to be understood, however, that numerous changes and variations may be made in the construction of the present container within the spirit of the present invention. It should therefore be further understood that the foregoing specification relates only to a preferred embodiment of the present invention and that modifications may be made therein without departing from the scope thereof asset forth in the appended claims.

I claim:

1. A wood reinforced corrugated paperboard shipping container comprising:

a base frame suitable for supporting an article to be packed, said base frame including at least one wood strip that extends substantially a length of said base frame;

a corrugated paperboard body defining inner wall surfaces and corresponding outer wall surfaces said corrugated paperboard body comprising a wall forming blank of paperboard scored to provide a series of main panels foldably joined together at a plurality of corners and dimensioned for mating engagement with said base frame such that at least one of said main panels extends the length of said at least one wood strip;

at least one substantially vertically aligned reinforcement fixedly secured to one of said inner wall surfaces of said main panels and positioned adjacent one of said corners thereof, but sufficiently distanced from said corners to permit collapsing of said corrugated paperboard body;

at least one substantially horizontal attaching strip fixedly secured to one of said inner wall surfaces of said corrugated paperboard body, said at least one attaching strip being positioned on said respective inner wall surface for alignment with said at least one wood strip of said base frame;

a top frame dimensioned for receipt by said corrugated paperboard body; and means for attaching said at least one attaching strip to said at least one wood strip whereby attachment of said corrugated paperboard body to said base frame provides a wood-to-wood connection that ensures against component separation.

2. The shipping container of claim 1 wherein said attaching strips are positioned at a lowermost edge portion of said corrugated paperboard body.

3. The shipping container of claim 1 wherein said at least one substantially vertically aligned reinforcement is notched at a lower portion so that said at least one vertical reinforcement may be attached directly to said base frame.

4. The shipping container of claim 3 wherein said at least one attaching strip is positioned at a lower edge portion of said corrugated paperboard body in substantial alignment with said notched portion of said at least one substantially vertically aligned reinforcement such that said at least one substantially vertically aligned reinforcement and said at least one attaching strip of said corrugated paperboard body may be fixedly attached to said base frame.

5. The shipping container of claim 4 further comprising at least one center post fixedly secured to at least one of said inner wall surfaces of said corrugated paperboard body.

6. The wood reinforced paperboard shipping container of claim 1, wherein said means for attaching comprises staples, each said staple inserted through said corrugated paperboard body and said at least one attaching strip into said at least one wood strip.

7. A wood reinforced corrugated paperboard shipping container, comprising:

a corrugated paperboard body comprising a wall forming blank of paperboard scored to provide a first, a second, a third, and a fourth main panel defining interior container walls and exterior container walls, foldably joined together at corners, said panels each defining an upper portion and a lower portion;

a pair of vertical supports fixedly secured to the interior wall of said first main panel and said third main panel of said corrugated paperboard body, each of said pair of vertical supports having a beveled top portion and a notched lower portion, said notched portion being one-half the width of the remaining portion of said vertical support;

a plurality of wooden attaching strips secured about a lower portion of said corrugated paperboard body such that at least one of said attaching strips is secured to one of each of said first, said second, said third and said fourth main panels in substantial alignment with said notched lower portion of said vertical supports, said attaching strips being of a width substantially equal to that of said vertical supports at said notched portions;

a wooden rigid base member for mating connection with said corrugated paperboard body such that said base member is aligned with said attaching strips;

a top frame, said top frame including beveled notches positioned for mating engagement with said top beveled portions of said vertical supports; and means for attaching said wooden attaching strips to said rigid base member, whereby attachment of said attaching strips of said corrugated paperboard body to said base member provides a wood-to-wood connection ensuring against separation thereof.

8. The wood reinforced corrugated paperboard shipping container of claim 7, further comprising at least one vertical support member fixedly secured to the interior walls of said second main panel and said fourth main panel intermediate of said corners.

9. The wood reinforced corrugated paperboard shipping container of claim 7, wherein said means for attaching comprises staples, each said staple inserted through said corrugated paperboard body and one of said attaching strips into said base member.

10. A wood reinforced corrugated paperboard shipping container, comprising:

a base frame for supporting an article to be packed, said base frame including at least two [cornered] wood strips that extend substantially the length of said base *frame;* a wood reinforced corrugated paperboard body defining inner container walls and corresponding outer container walls, said paperboard body comprising a wall forming blank of paperboard scored to provide a series of panels foldably joined together at a plurality of corners and configured for engagement to said base frame;

a plurality of substantially vertical, wooden supports fixedly secured to said inner container walls adjacent said corners and sufficiently distanced therefrom to permit collapse of said paperboard body, said substantially vertical supports each including a notched lower portion;

at least two attaching strips fixedly secured to a lowermost portion of said inner container walls said two attaching strips being substantially equal in length to said wood strips of said base frame; and means for securing said attaching strips to said wood strips, whereby said wood reinforced corrugated paperboard body is secured to said base frame such that said wood strips of said base frame extend into said notches of said vertical supports, whereby any lifting force exerted on said base frame is in part transferred to said vertical supports and any clamping force exerted on said vertical supports is, in part, transferred to said wood strips.

11. The wood reinforced corrugated paperboard shipping container of claim 10, wherein said vertical supports define a beveled edge at an uppermost end; and said container further comprises a top frame, said top frame including at least two supports that extend substantially the length of said container body and include notches dimensioned for receipt of said beveled uppermost edges of said vertical supports such that a downwardly acting force exerted on said to frame is borne by said top frame supports, said vertical supports and said wood strips of said base frame.

12. The wood reinforced corrugated paperboard shipping container of claim 10, wherein said means for securing comprises staples, each said staple inserted through said corrugated paperboard body and one of said attaching strips into one of said wood strips.

*13. A reinforced corrugated paperboard shipping container, comprising:*

*a base frame for supporting an article to be packed, said base frame including at least two wood strips;*

*a corrugated paperboard body comprising a wall forming blank of paperboard scored to provide a series of panels foldably joined together at a plurality of corners and configured for engagement to said base frame;*

*a plurality of substantially vertical supports fixedly secured to said container walls adjacent said corners for reinforcing said paperboard body and sufficiently distanced therefrom to permit collapse of said paperboard body;*

*at least two attaching strips, each one fixedly secured to a separate one of said panels and positioned for alignment with one of said wood strips; and*

*means for connecting said attaching strips to said wood strips,*

*whereby engagement of said reinforced corrugated paperboard body to said base frame by connecting said attaching strips to said wood strips ensures against component separation.*

*14. The reinforced corrugated paperboard shipping container as recited in claim 13, wherein said vertical supports are wood.*

*15. The reinforced corrugated paperboard shipping container as recited in claim 13, wherein said attaching strips are wood.*

*16. The reinforced corrugated paperboard shipping container as recited in claim 13, wherein said means for securing comprises a plurality of staples, each said staple inserted through said corrugated paperboard body and one of said attaching strips into one of said wood strips.*

*17. The reinforced corrugated paperboard shipping container as recited in claim 13, wherein each said attaching strip is substantially equal in length to its associated said wood strip.*

*18. The reinforced corrugated paperboard shipping container as recited in claim 13, wherein said attaching strips are fixedly secured to an inner surface of said panels.*

* * * * *

US00RE34557F1

(12) EX PARTE REEXAMINATION CERTIFICATE (7016th)

United States Patent

Grigsby

(10) Number: US RE34,557 F1

(45) Certificate Issued: Aug. 25, 2009

(54) WOOD REINFORCED CORRUGATED PAPERBOARD SHIPPING CONTAINER WITH ATTACHING STRIPS

(75) Inventor: John M. Grigsby, Marietta, GA (US)

(73) Assignee: North American Container Corporation, Mableton, GA (US)

Reexamination Request:
No. 90/006,937, Feb. 17, 2004

Reexamination Certificate for:

| | |
|---|---|
| Patent No.: | **Re. 34,557** |
| Issued: | **Mar. 8, 1994** |
| Appl. No.: | **07/704,345** |
| Filed: | **May 23, 1991** |

Related U.S. Patent Documents

Reissue of:

| | |
|---|---|
| (64) Patent No.: | **4,832,256** |
| Issued: | **May 23, 1989** |
| Appl. No.: | **07/241,499** |
| Filed: | **Sep. 7, 1988** |

Related U.S. Application Data

(63) Continuation of application No. 06/936,426, filed on Dec. 1, 1986, now abandoned.

(51) Int. Cl.
*B65D 5/44* (2006.01)

(52) U.S. Cl. ..... 229/122.27; 229/199.1; 206/335; 206/386; 217/36; 217/65

(58) Field of Classification Search ..... None
See application file for complete search history.

(56) References Cited

U.S. PATENT DOCUMENTS

| | | | | |
|---|---|---|---|---|
| 1,990,788 A | * | 2/1935 | Kells | 217/12 A |
| 2,177,507 A | | 10/1939 | Weiller | |
| 2,177,933 A | * | 10/1939 | Boeye | 229/122.21 |
| 2,442,651 A | * | 6/1948 | Johnson | 217/48 |
| 2,768,738 A | * | 10/1956 | Whiton et al. | 206/320 |
| 2,790,544 A | * | 4/1957 | Whiton et al. | 206/320 |
| 2,920,809 A | | 1/1960 | Bray | |
| 3,493,141 A | | 2/1970 | Salter | |
| 3,494,535 A | | 2/1970 | Acker | |
| 4,230,227 A | | 10/1980 | Kowall et al. | |

* cited by examiner

*Primary Examiner*—Tri M. Mai

(57) ABSTRACT

A wood reinforced corrugated paperboard shipping container is disclosed having a rigid wood base, a wood reinforced corrugated paperboard body attached thereto and a top frame. The wood reinforced corrugated paperboard body includes attaching strips at the location of the base whereby a wood-to-wood connection is achieved. The wood-to-wood connection, in combination with selectively notched vertical reinforcements, provides for heavy equipment to be packed, shipped, handled and stored without container component separation.

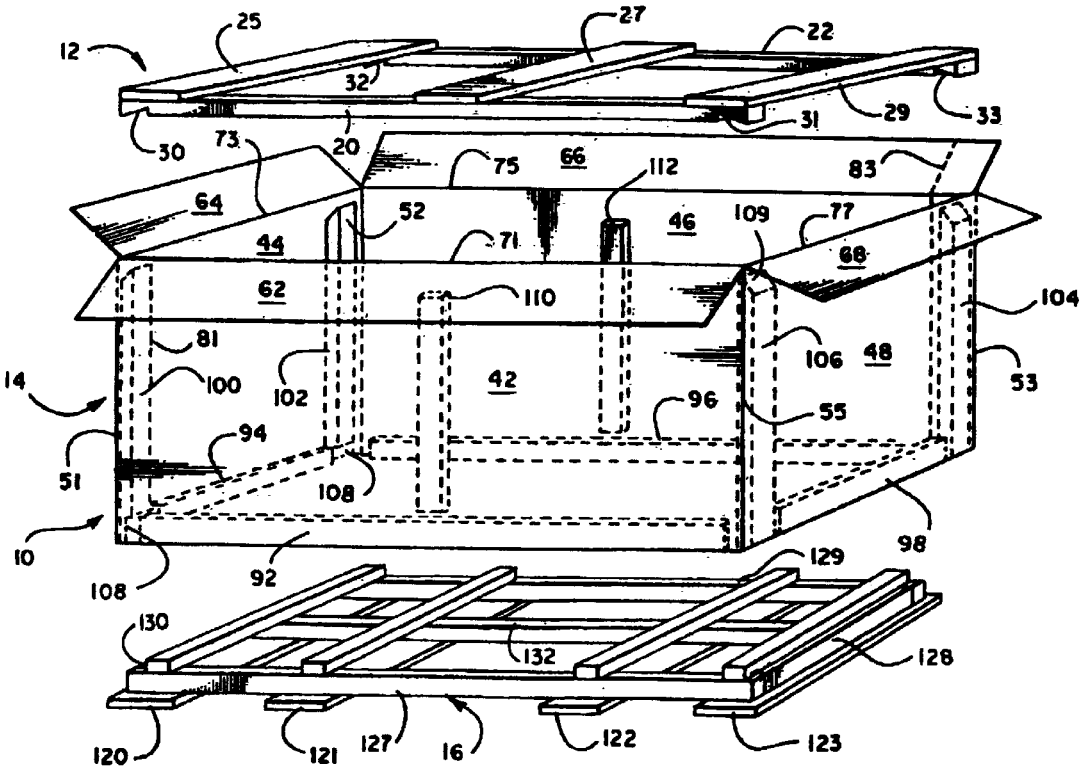

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 1–12, 15 and 17–18 is confirmed.

Claims 13, 14 and 16 are cancelled.

* * * * *